July 13, 1965    R. C. BATES ETAL    3,194,642
WELDING STRUCTURE AND METHOD OF MAKING SUCH STRUCTURE
Filed April 22, 1960    6 Sheets-Sheet 1

WITNESSES
Edwin E. Bassler
James F. Young

INVENTORS
Robert C. Bates, Robert W. Huston
and Fred J. Morley, Jr.
BY Hymen Diamond
ATTORNEY

United States Patent Office 3,194,642
Patented July 13, 1965

3,194,642
WELDING STRUCTURE AND METHOD OF MAKING SUCH STRUCTURE
Robert C. Bates, Monroeville, Robert W. Huston, Wilkinsburg, and Fred J. Morley, Jr., Hempfield Township, Westmoreland County, Pa., assignors to Westinghouse Electric Corporation, East Pittsburgh, Pa., a corporation of Pennsylvania
Filed Apr. 22, 1960, Ser. No. 24,044
7 Claims. (Cl. 29—191)

This invention relates to the metals-joining art and has particular relationship to the fabrication by welding of assemblies of nodular cast iron of the type disclosed in Millis Patent 2,485,760 and related patents. Essentially nodular form is cast iron in which the free carbon is predominated in nodular or spheroidal form.

In the fabrication of assemblies of nodular cast iron arc welding is to be preferred over such processes as oxy-acetylene welding because arc welding permits fabrication at a higher speed and does not subject the operator to the discomforts of working at high temperatures to which he is subject in oxyacetylene welding. In arc welding, the practice is to use a consumable rod electrode. Typical such electrodes are Ni-Rod 55, Ni-Rod, AISI 307 stainless steel and E6016 mild steel, low hydrogen electrode. Ni-Rod 55 and Ni-Rod are sold by International Nickel Company. Ni-Rod 55 has essentially 55% nickel and the remainder iron (Ni-Rod essentially 100% nickel).

The arc welded joints made in accordance with the teachings of the prior art have been found to be deficient both with respect to ductility and with respect to impact strength. It is then broadly an object of this invention to provide welded assemblies of nodular iron in which the welded joints shall have substantial ductility and strength.

This invention in its most rudimentary form is based on the discovery that the deficiency in ductility and strength of a nodular-iron arc welded joint arises from the microstructure of the joint and particularly of the heat-affected zone of the joint. The joint has been found to be made up of a weld-metal region, a region in which there are massive carbides, and a region in which there are such transformation products as pearlite, martensite, and spheriodite, the latter transformation products have been found to extend deeply into the base metal. The massive-carbide regions are very brittle, having very little impact strength and no appreciable ductility. This is shown by the following Tables I and II which compare the hardness and ductility of the unwelded nodular iron (Table I) with the as-welded structure (Table II).

TABLE I

*Unwelded ferritic nodular cast iron*

| Thickness, Inches | Approximate hardness BHN (3000 kg.) | Total bend prior to cracking in slow-bend test, degrees |
|---|---|---|
| .723 | 139 | 30 |

TABLE II

*As-welded ferritic nodular iron*

| Thickness, inches | Approximate hardness in heat-affected zone, BHN (3000 kg.) | | Total bend prior to cracking in root-bend test, degrees |
|---|---|---|---|
| | Carbide portion | Pearlite portion | |
| .615 | 600 | 240 | 3 |
| .675 | 600 | 244 | 3 |
| .637 | 600 | 240 | 2 |

The tables are based on actual tests; the tests for Table II were carried out with welded structures produced by arc welding nodular iron with a consumable electrode of Ni-Rod 55. The hardness in the case of the welded joints was determined both for the carbide region and for the pearlite regions; the former being determined as a Knoop Hardness number and converted into BHN (Brinell Hardness units). Table II shows that the massive-carbide regions are very brittle and that the pearlite regions are less brittle than the massive-carbide regions. Substantial improvement would be achieved by eliminating the massive-carbides.

It has been found that the properties of the welded joint can be improved by an annealing treatment which first converts the carbides and the transformation products into austenite and graphite and then converts the austenite into ferrite and graphite. Specifically the conversion into austenite and graphite is effected by maintaining the welded joint at an elevated temperature for a long time interval; typically the joint must be maintained at about 1650° F. for four hours. This decomposes the massive-carbides and converts the transformation products into austenite and graphite. The second transformation is effected by decreasing the temperature of the weld from 1650° F. to about 1000° F. at the rate of about 60 F. degrees per hour and thereafter the temperature is permitted to drop to ambient temperature. This transforms the austenite into ferrite and graphite.

The following Table III shows the results of hardness tests and bending tests performed on specimens of the annealed welds. The hardness and ductility are shown by these tests to have been materially improved.

TABLE III

*Ferritic nodular iron annealed after welding*

| Thickness, inches | Hardness of heat-affected zone, BHN (3000 kg.) | Total bend prior to cracking in root-bend test, degrees |
|---|---|---|
| .684 | 178 | 18 |
| .659 | 183 | 10 |

While the above-described annealing treatment is readily carried out in a laboratory, it presents serious problems in practice. A structure may be assembled in the field where an annealing furnace is not available or it may be so large or of such form as not to lend itself to treatment in an annealing furnace.

It is then an object of this invention to provide a method of fabricating a welded structure of nodular iron having suitable hardness and ductility in places where, or under circumstances in which, the annealing treatment may not readily be performed, and it is another object of this invention to provide an article or a product particularly suitable for such fabrication.

In accordance with this invention the structure to be fabricated in the field is prepared by a buttering treatment followed by an annealing treatment as described above. The buttering may be effected by depositing an overlay by arc welding with a suitable electrode such as Ni-Rod 55, Ni-Rod, AISI 307 or the others; the annealing treatment then converts the carbides and the other transformation products into ferrite and graphite.

Both the buttering and the annealing can be performed at the foundry where the nodular iron is cast or other location where adequate facilities are available. The advantage of performing this operation at the foundry is that it can readily be worked into the normal procedure for the nodular iron itself. The usual procedure is to subject the nodular iron to an annealing treatment such as the one described to convert the nodular iron completely into ferritic iron. The iron to be treated in accordance with this invention can be buttered and then handled like, and with the same facilities as, the unbuttered iron.

The joining to assemble the structure may then be effected by arc welding using Ni-Rod 55 or other material compatible with the overlay without subsequent annealing in the field. The overlay should be sufficiently thick that the subsequent welding operation in the field does not result in penetration of the heat-affected zone into the original nodular iron base metal. A minimum thickness of 3/16" on each face is recommended.

The joints of the resulting assembly between the overlay and the nodular iron have substantial impact strength and ductility because they have been annealed; the joints between the overlay and the parts joined to the overlay in the field do not require annealing because they are between materials which do not form harmful carbides during welding. In actual practice it has been found that the heat-affected zone does not penetrate into the original base metal.

The novel features considered characteristic of this invention are disclosed generally above. Certain specific features of the invention together with additional objects thereof will be understood from the following description of a specific embodiment taken in connection with the accompanying drawing in which.

Figure 8:
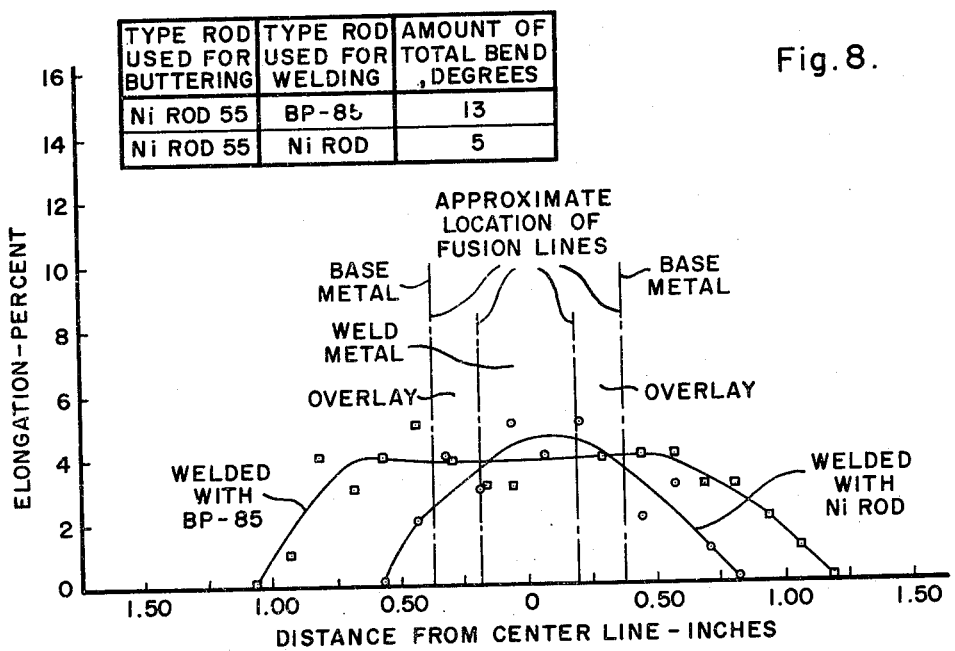
Figure 9:
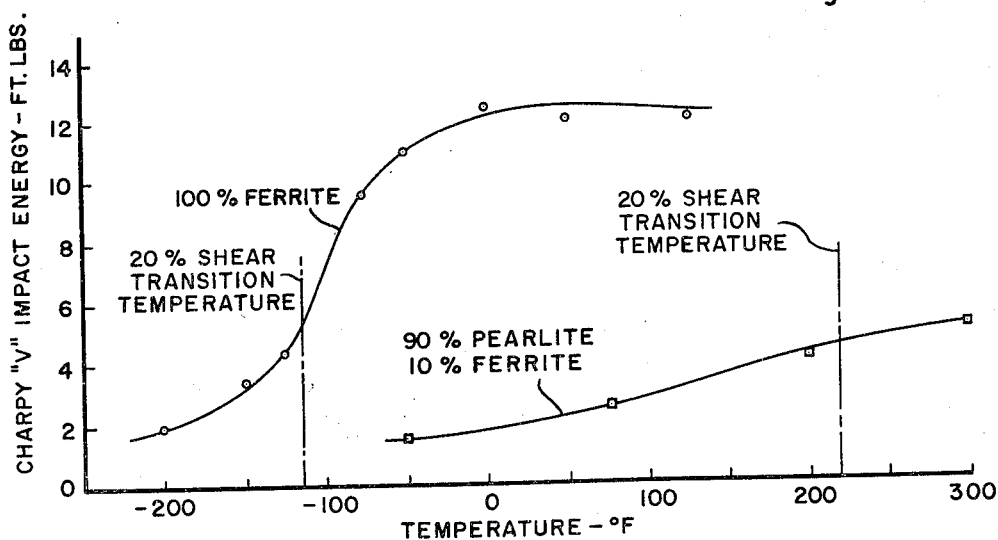

FIG. 8 is a graph comparing the elongation during slow bending as a function of the distance from the center line of the fusion zone of welds between BP 85 weld rod (made by International Nickel Company) and nodular iron buttered with Ni-Rod 55 and between Ni-Rod and nodular iron buttered with Ni-Rod 55; and, FIG. 9 is a graph comparing the impact strength of ferrite and of pearlite as a function of temperature.

At the outset it is believed desirable to explain the manner in which tests are made in evaluating welds made in accordance with this invention. For this purpose reference is made to FIG. 1 which shows in perspective a welded specimen ruptured by bending. This specimen is made by butt welding buttered sections of nodular iron disposed so that their abutting ends form a groove of 60° V included angle. The fusion zone and the root are identified by labelling in FIG. 1. The bend is produced so that the root side of the fusion zone is in tension and the face side in compression.

The root side of the specimen has a dye tinted area D in the center. Transverse lines L are ruled in the area D. The lines L are spaced a short distance, say 1/8 inch. The elongation may be determined by measuring the increase in the spacing between lines L.

The region of the fusion zone of a weld may be regarded as divided into several sections. These include from one boundary of the weld to the other: the base metal, the overlay, the weld metal, the overlay, the base metal. The boundaries of these sections differ in microstructure.

Figure 2:
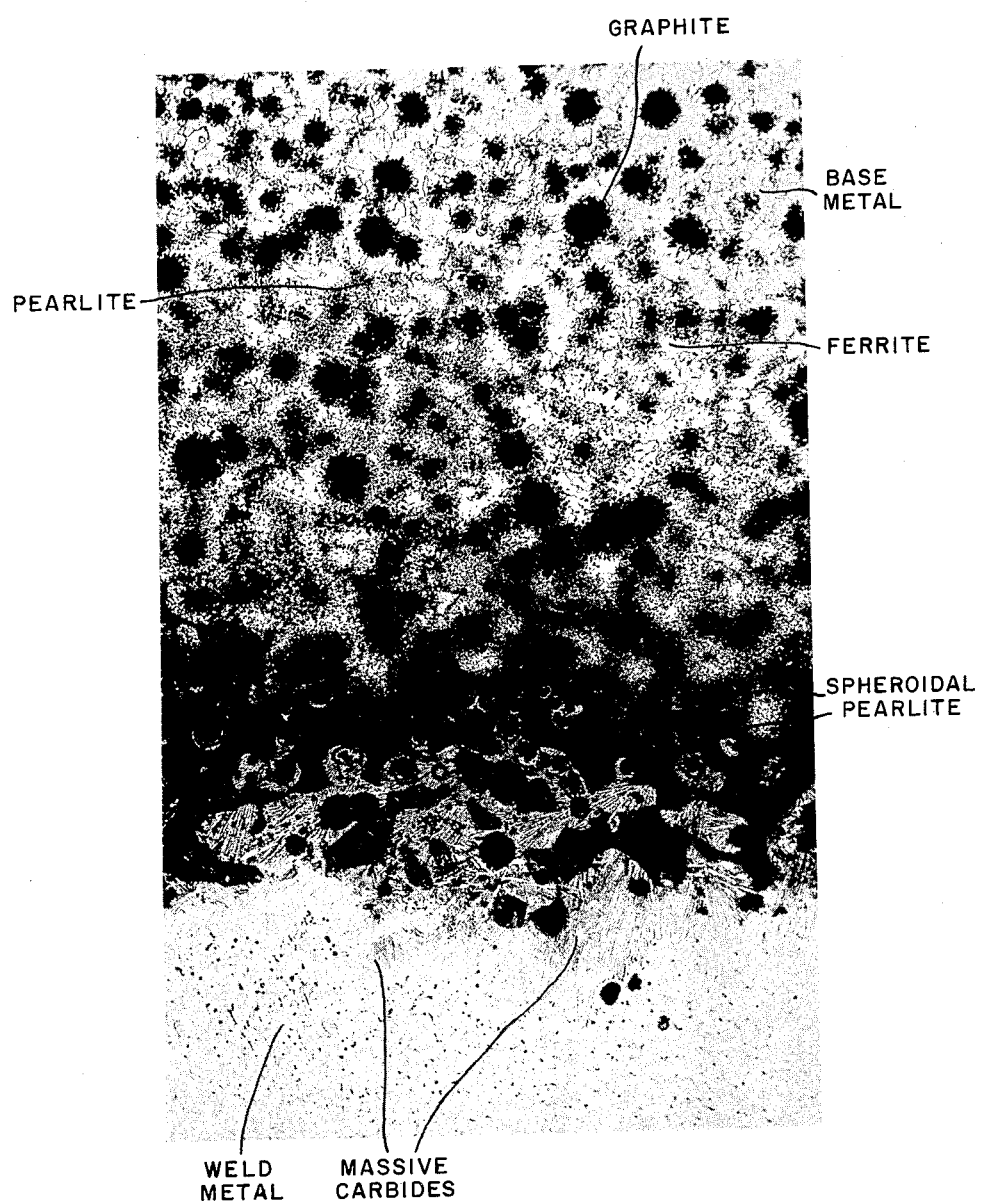
FIG. 2 is a photomicrograph of the weld zone, unannealed, of a weld between nodular iron and Ni-Rod 55 produced by arc-welding.

FIG. 2 was derived from a weld produced in accordance with the teachings of the prior art by depositing metal from a consumable electrode of Ni-Rod 55 on work of nodular iron. A cut was taken through the joint, unannealed, and the region in the weld zone was etched with 2% Nital and photographed with a magnification of 100 times. The labelling on FIG. 2 shows the weld metal, the massive carbides, the spheroidal pearlite, and a mixture of pearlite and ferrite. A significant feature of the weld shown by FIG. 2 is the presence of the massive carbides. Another feature is the penetration of the pearlite into the base metal or work.

Figure 3:
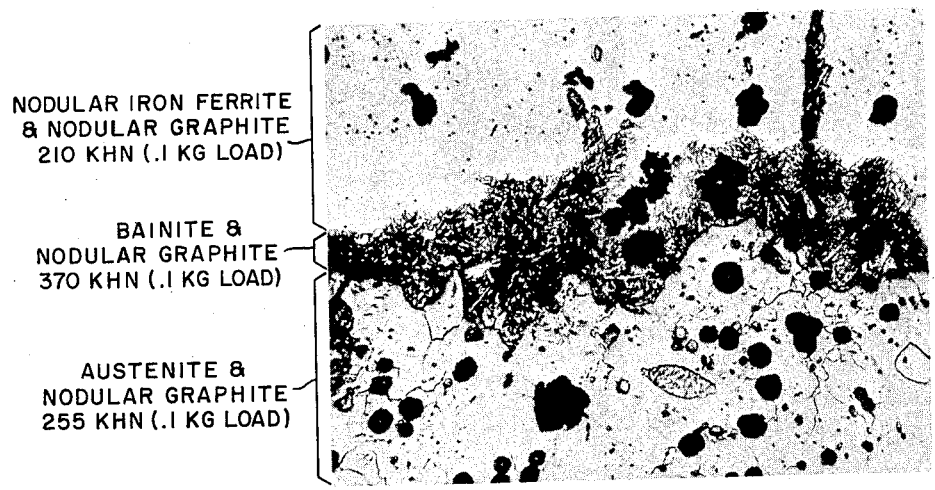
FIG. 3 is a photomicrograph of the joint between the overlay and the parent nodular iron of a weld made by depositing Ni-Rod 55 on the overlay of nodular iron buttered with Ni-Rod 55.

FIG. 3 is a photomicrograph of a weld in accordance with this invention in which the overlay and the weld metal are both Ni-Rod 55. This view is labelled to describe the microstructure and under the label identifying each part of the joint the hardness in Knoop Hardness units is indicated. The significant improvements shown by FIG. 3 are the absence of massive carbides and the absence of products of the fusion such as martensite or pearlite in the base metal. But a thin layer of bainite exists at the junction of the parent nodular iron and the overlay.

Figure 4:
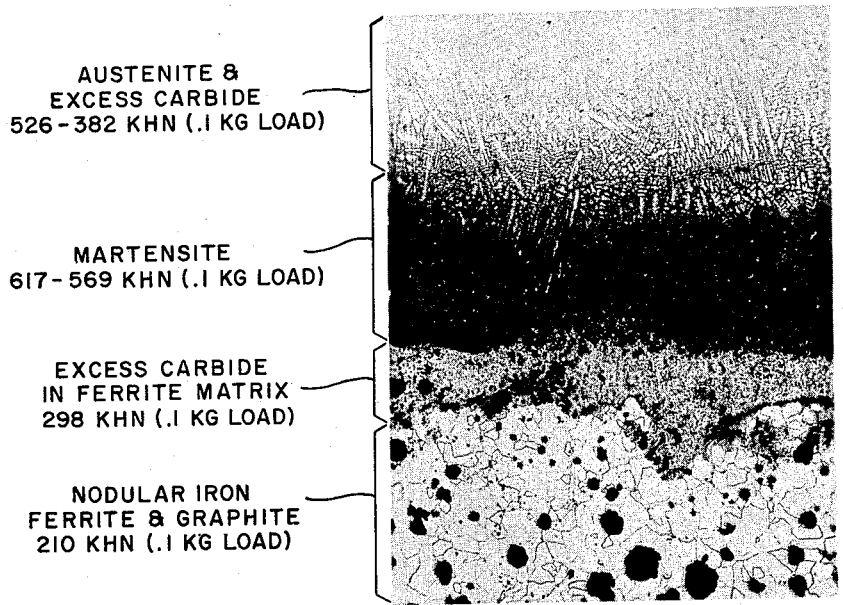
FIG. 4 is a photomicrograph of the joint between the overlay and the parent nodular iron of a weld made by depositing AISI 307 on the overlay of nodular iron buttered with AISI 307.

FIG. 4 is a similar photomicrograph for a joint with AISI 307 overlay and AISI 307 weld metal. In this case there is excess carbide and martensite in the joint, but the base metal is free of these products. Massive carbides are absent.

Figure 5:
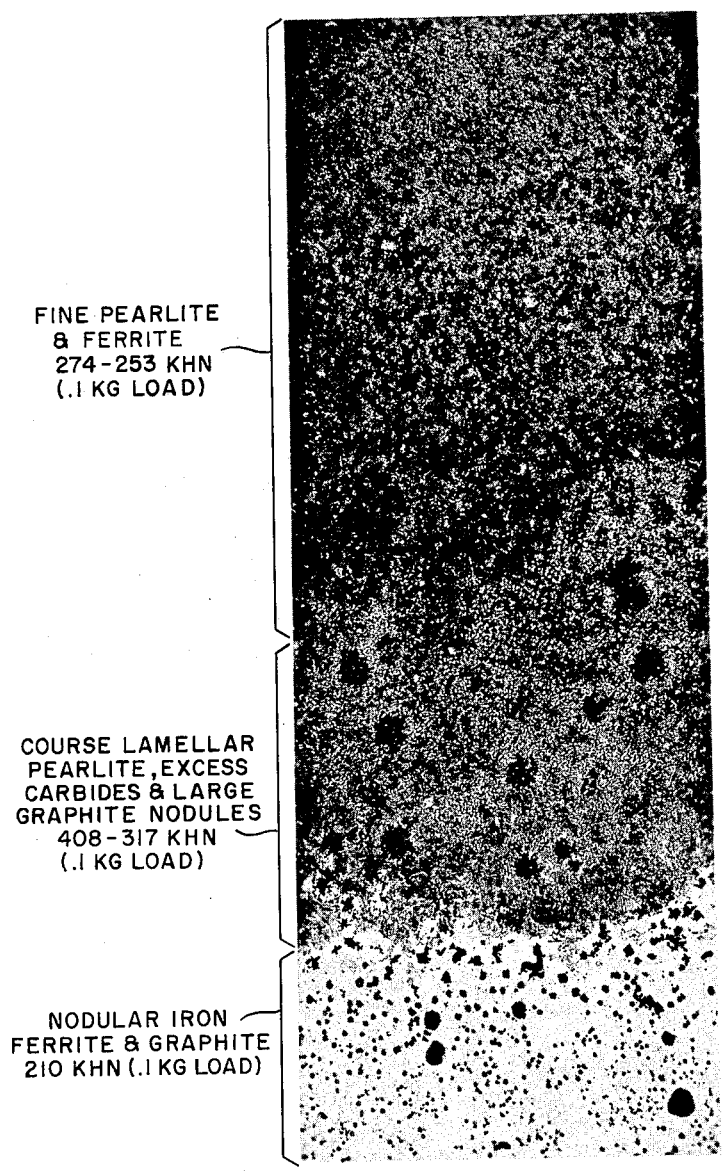
FIG. 5 is a photomicrograph of the joint between the overlay and the parent nodular iron of a weld made by depositing E6016 on the overlay of nodular iron buttered with E6016.

FIG. 5 is a similar photomicrograph for a weld in which E6016 is the overlay and weld metal. In this case there is pearlite and excess carbide in the metal, but no massive carbides. Again there is no penetration of excess carbides and pearlite into the base metal.

The following Table IV presents the results of strength and ductility tests conducted with specimens made in accordance with this invention.

TABLE IV

*Mechanical properties of welded nodular iron in which overlay was deposited prior to welding*

| 1 | 2 | 3 | 4 | 5 | 6 |
|---|---|---|---|---|---|
| Type Rod Used For Overlay | Type Rod Used For Welding | Ultimate Tensile Strength, p.s.i. | 0.2% Off-Offset Yield Strength, p.s.i. | Percent Elong. in 2 in. | Bend-Angle in Slow Root-Bend Test, Degrees |
| Ni-Rod 55 | Ni-Rod 55 | 56,350 | 44,550 | 2.6 | 2 |
| Ni-Rod 55 | Ni-Rod 55 | | | | 2 |
| Ni-Rod 55 | 307 | | | | 2 |
| Ni-Rod 55 | E6016 | | | | 3 |
| Ni-Rod 55 | Ni-Rod | | | | 5 |
| Ni-Rod 55 | BP-85 | | | | 13 |
| 307 (Series #1) | 307 | 61,300 | 43,550 | 7.6 | 23 |
| 307 (Series #2) | 307 | 59,200 | 43,950 | 5.8 | 18 |
| E6016 | E6016 | 61,450 | 44,550 | 4.6 | 11 |
| E6016 | E6016 | 61,750 | 44,200 | 5.7 | 13 |

Ni-Rod 55 is a ferrous alloy composed of about 55% nickel and the remainder iron. AISI 307 is a chromium, nickel, manganese, stainless steel. A typical composition is given in column 3 of Patent 2,862,103. E6016 is an electrode of mild steel with low-hydrogen coating.

Columns 1 and 2 describe the overlay and the weld metal of each weld. The other columns present the data derived to the extent that it was available. The first four specimens produced approximately the same ductility as joints containing massive carbides, but appreciable ductility in manifested by the other specimens which shows a vast improvement over joints containing massive carbide which have no appreciable ductility.

Figure 1:
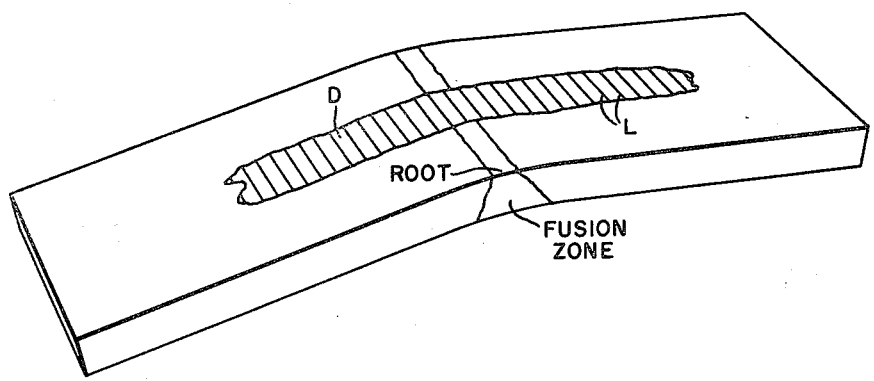
FIGURE 1 is a view in perspective illustrating the manner in which specimens are tested in deriving data involved in this invention.
Figure 6:
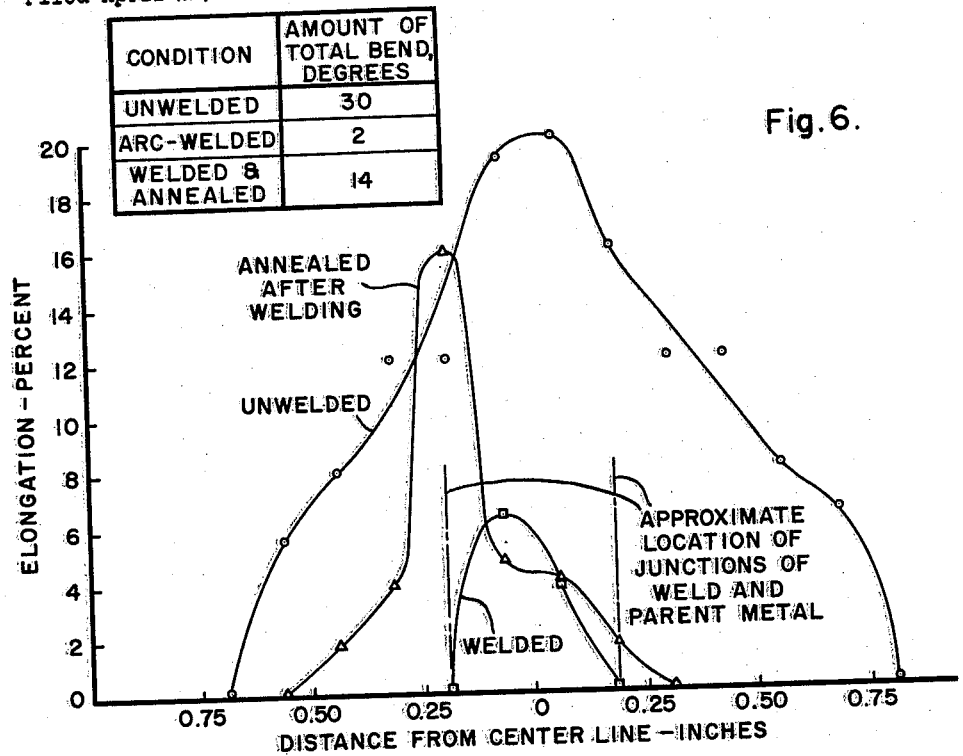
FIG. 6 is a graph comparing the elongation during slow bending as a function of the distance from a center line of unwelded nodular iron with the like elongation as a function of the distance from the center line of the fusion zone of as-welded nodular iron and welded nodular iron annealed.

FIG. 6 shows the elongation as a function of the distance from the center (o) for an unwelded specimen of nodular iron, a specimen welded with Ni-Rod 55 but not annealed, and a like annealed specimen. The elongation was in each case determined by measuring the increase of the distance between the lines L of the specimen after it had been bent as illustrated in FIG. 1. The curve for the as-welded specimen shows the effect of the massive carbides. The peak for the annealed specimen is displaced from the center because in bending this specimen the load was displaced from the center. The improvement achieved by annealing is clearly shown.

Figure 7:
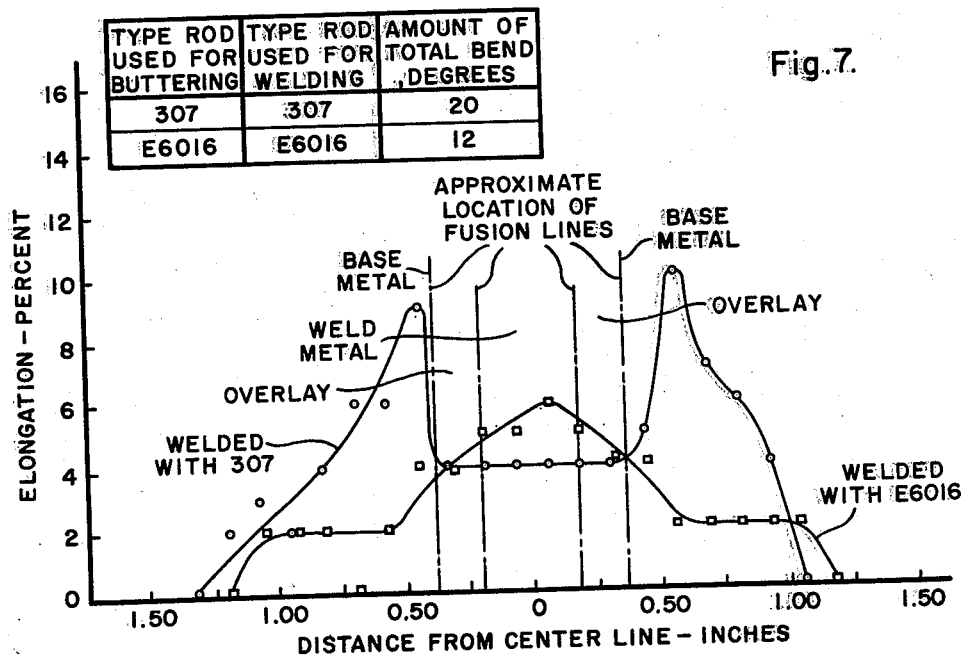
FIG. 7 is a graph comparing the elongation during slow bending as a function of the distance from the center line of the fusion zone of the welds between AISI 307 and nodular iron buttered with AISI 307 and between E6016 and nodular iron buttered with E6016.

FIG. 7 shows curves similar to FIG. 6 of welds between nodular iron with overlays of AISI 307 and E6016 and AISI 307 and E6016, respectively. AISI 307 specimen has a higher ductility except in the fusion zone where the E6016 is somewhat higher.

FIG. 8 shows curves similar to FIG. 7 for specimens of nodular iron overlaid with Ni-Rod 55 and welded with BP 85 and Ni-Rod respectively. The BP 85 on the whole has higher ductility.

FIG. 9 shows the effect of pearlite on strength. This view shows the impact energy required to produce rupture as a function of temperature for a series of specimens of 100% ferrite and a series of specimens of 90% pearlite-10% ferrite. Impact energy is plotted vertically as Charpy V impact energy in foot-pounds; temperatures in degrees F. are plotted horizontally. The portions of the curves to the extreme left correspond to the energies for which the failure was in cleavage; the portion on the extreme right corresponds to the energies for which the failure was in shear. The labelled ordinates indicate the temperatures at which the fractures were 20% shear and 80% cleavage.

It is seen that over the whole temperature range the ferrite has a substantially higher impact energy than the pearlite. The curves also show that for the ferrite the 20% shear transition temperature is about minus 110° F. while for the pearlite it is about 210° F.

The annealing converts the pearlite and like components into ferrite and graphite and thus materially strengthens the weld and in addition improves the ductility.

The following summary will help in an understanding of this invention:

In the arc welding of ferritic nodular cast iron a heat-affected zone is produced including massive carbides and/or one or more transformation products such as martensite, spheriodite and pearlite, adjacent to the weld deposits.

The effect of these constituents in the heat-affected zone of nodular iron on the ductility and hardness is shown by the data contained in Table II. The small ductility exhibited by the welded joints actually occurred in the weld metal. No ductility whatever was exhibited at the fusion lines. Not only does the extreme brittleness of the heat-affected zone hamper designers in utilizing nodular iron, but the higher hardness of this zone also creates difficulty in machining.

The ductility of welded joints is considerably improved and the hardness of the heat-affected zone is decreased by a post-weld graphitizing-ferritizing annealing treatment. The annealing treatment for the samples used in arriving at this invention consisted of heating at 1650° F. for four hours, furnace cooling at 60 F. degrees per hour to 1000° F., and then air cooling to room or ambient temperature. The annealing treatment can be substantially modified and still remain effective, but basically it has a two-fold purpose: (1) to decompose the massive carbide and the transformation products into austenite and graphite by holding at a temperature at which the carbide and other products are unstable, and (2) to transform the austenite into ferrite plus graphite by cooling slowly through, or holding the temperature near, the transformation range.

In addition to increasing ductility, post-weld annealing substantially improves the machinability because of the elimination of massive carbide, pearlite, and other relatively hard constituents.

Pearlite in the microstructure is not as objectionable as massive carbides but causes the following disadvantages:

(1) Relatively low ductility in the weld zone.

(2) Higher hardness than the parent metal; hence increased difficulty in machining is encountered.

(3) Lower impact energy and higher ductile-to-brittle transition temperature than exhibited by the parent metal (FIG. 3) which may lead to brittle, catastrophic failure unless proper precautions are utilized.

Post-weld annealing is not always practical or possible, especially if the welding operation is performed at locations at which no annealing equipment is available. Further, excess warpage or physical size of finished fabricated structures may prevent post-weld annealing. This invention provides welded joints in ferritic nodular cast iron which will permit field welding and does not require post-weld annealing. The properties of such welds are similar to those normally obtained in welds which are subjected to post-weld graphitizing-ferritizing annealing treatments.

The first step in the welding procedure according to this invention in one of its specific aspects is to deposit a weld overlay of Ni-Rod 55 (55% nickel-balance iron) sold by International Nickel Company or other material readily weldable with nodular iron on the nodular iron to be joined. After the overlay is deposited, specimens are given a graphitizing-ferritizing annealing treatment like that used in annealing "as-cast" nodular iron to produce ferritic nodular iron. Specimens may then be arc welded using weld metal that is compatible with the overlay deposit.

The overlay is applied to nodular iron as follows:

The surface is cleaned thoroughly so that it is free of substantially all foreign material such as grease, oil, machining lubricants, dirt, paint, and oxides. The material to be overlaid is heated to 400–600° F. The overlay is deposited with a consumable electrode by producing an arc between the electrode and the surface to be overlaid and using the stringer bead technique; that is, a series of weld beads are made without weaving the electrode.

The overlaid structure produced may be used in fabricating by welding with the following advantages:

(1) The heat-affected zone during final welding is confined to the deposited overlay. Since this overlay does not form deleterious constituents upon solidification and cooling, this method of joining eliminates the need for post-weld annealing of the weldment.

(2) The elimination of the need for post-weld annealing facilitates and makes possible field welding because the overlay may be deposited prior to annealing the castings at the foundry, and final welding to similar or dissimilar materials may be carried out in the field.

(3) While the technique for applying the deposited overlay described above is based on arc welding with Ni-Rod 55, any method of applying the overlay using any filler metal which is compatible with nodular cast iron is satisfactory, provided that the deposited overlay does not form deleterious constituents upon solidification and cooling after final welding.

While preferred embodiments of this invention have been disclosed herein many modifications thereof are feasible. This invention then is not to be restricted except insofar as is necessitated by the prior art.

We claim as our invention:

1. The method of preparing a portable structure of nodular iron, in which the free carbon is predominately in the form of nodules, said structure having dimensions readily permitting annealing treatment, said structure to form a part of a substantially larger assembly by the subsequent welding of said structure to contiguous members at a remote site, said larger assembly being too large to be subjected to annealing treatment at said site, the said method comprising buttering said structure in the region where it is to be welded to said contiguous members with a ferrous alloy readily weldable to said iron, said buttering producing massive carbides and transformation products such as martensite, spheriodite, pearlite, in said buttered region, then annealing said buttered region by maintaining said region at an elevated temperature for a predetermined time interval, said temperature and interval being such that said carbides are substantially decomposed and said transformation products are substantially converted into austenite and graphite, and thereafter cooling said buttered region slowly through the transformation range to transform said austenite substantially into ferrite and graphite, the overlay produced by said buttering being so thick that it is effective, during the subsequent welding to said contiguous member, to prevent the heat-affected zone from penetrating into the original nodular-iron base metal.

2. The method of preparing a portable structure of nodular iron, in which the free carbon is predominately in the form of nodules, said structure having dimensions readily permitting annealing treatment, said structure to form a part of a substantially larger assembly by the subsequent welding of said structure to contiguous members at a remote site, said larger assembly being too large to be subjected to annealing treatment at said site, the said method comprising buttering said structure in the region where it is to be welded to said contiguous member with a ferrous alloy readily weldable to said iron, said buttering producing massive carbides and transformation products such as martensite, spheriodite, pearlite, in said buttered region, then converting the carbides and transformation products in said region substantially into austenite and graphite, and thereafter transforming said austenite substantially into ferrite and graphite, the overlay produced by said buttering being so thick that it is effective, during the subsequent welding to said contiguous member, to prevent the heat-affected zone from penetrating into the original nodular-iron base metal.

3. The method of preparing a structure of nodular iron, in which the free carbon is predominately in the form of nodules, said structure having dimensions readily permitting annealing treatment, said structure to form a part of a substantially larger assembly by the subsequent welding of said structure to a contiguous member, said larger assembly being too large to be subjected to annealing treatment at said site, the said method comprising buttering said structure in the region where it is to be welded to said contiguous member by depositing therein an alloy comprising essentially 55% nickel and the remainder iron, said buttering producing massive carbides and transformation products such as martensite, spheriodite, pearlite, then annealing said buttering structure by maintaining said structure at a temperature of about 1650° F. for about four hours, and then cooling said structure at the rate of about 60 F. degrees per hour until said region reaches a temperature of about 1000° F., and thereafter permitting said structure to cool to ambient temperature, the overlay produced by said buttering being so thick that it is effective, during the subsequent welding to said contiguous member, to prevent the heat-affected zone from penetrating into the original nodular-iron base metal.

4. As an article of manufacture a structure of nodular iron, in which the free carbon is predominately in the form of nodules, said structure having dimensions readily permitting annealing treatment, said structure to constitute a part of a substantially larger assembly by the subsequent welding, of said structure to a contiguous member of said assembly, said larger assembly being too large to be subjected to annealing treatment at said site, the region of said structure where said structure is to be welded to said member being buttered with a ferrous alloy readily weldable to said iron, said buttered structure having a microstructure substantially only of ferrite and graphite, the overlay produced by the buttering being so thick that it is effective, during the subsequent welding to said member, to prevent the heat-affected zone from penetrating into the original modular-iron base metal.

5. The method of preparing a portable structure of nodular iron, in which the free carbon is predominately in the form of nodules, said structure having dimensions readily permitting annealing treatment, said structure to form a part of a substantially larger assembly by the subsequent welding of said structure to a contiguous member of said assembly at a remote site, said larger assembly being too large to be subjected to annealing treatment at said site, the said method comprising, buttering said structure in the region where it is to be welded to said contiguous member with a ferrous alloy readily weldable to said iron, said buttering producing massive carbides and transformation products such as martensite, spheriodite, pearlite, said buttered structure, and thereafter converting said carbides and said transformation products substantially into ferrite and graphite, the overlay produced by said buttering being so thick that it is effective, during the subsequent welding to said contiguous member, to prevent the heat-affected zone from penetrating into the original nodular-iron base metal.

6. The method of producing a welded structure including at least a first section to which a second section composed essentially of nodular iron, in which the free carbon is predominately in the form of nodules, is joined at a site, said second section being of dimensions such that it may be readily treated in an annealing furnace, said first and second section when joined together being too large to be subjected to annealing treatment at said site, the said method comprising prior to the joining of said first and second sections buttering said second section in the region where it is to be joined to said first section with a material of a ferrous alloy readily weldable to the material of said first section, said buttering producing massive carbides and transformation products such as martensite, spheriodite, pearlite, in said buttered region, then annealing said buttered region by maintaining said region at an elevated temperature for a predetermined time interval, said temperature and interval being such that said carbides are substantially decomposed into austenite and graphite, thereafter cooling said buttered region slowly through the transformation range to transform said austenite substantially into ferrite and graphite, and after the said annealing and cooling joining said second section to said first section by welding said buttered region to said first section, the buttered region having a thickness such that it is effective, during said last-named welding to prevent the heat-affected zone from penetrating into the original nodular-iron base metal, the welded joint produced by said last-named welding being unannealed.

7. A welded structure including a section of nodular iron, in which the free carbon is predominately in the form of nodules, welded to said structure in a region of said section, said section having dimensions readily permitting annealing treatment and said welded structure being to large to be subjected to annealing treatment, said region of said section being buttered with a material of a ferrous alloy readily weldable to nodular iron and to the material of the portion of said structure to which said section is welded, said buttered section having a microstructure substantially only of ferrite and graphite, the thickness of the overlay produced by the buttering being such that it is effective during the welding of said section to said structure, to prevent the heat-affected zone from penetrating into the original nodular-iron base metal of said section.

References Cited by the Examiner

UNITED STATES PATENTS

| | | | |
|---|---|---|---|
| 1,144,106 | 6/15 | Burgess | 29—196.6 |
| 2,060,765 | 11/36 | Welch | 29—492 |
| 2,075,810 | 4/37 | George | 29—401 |
| 2,119,833 | 6/38 | Sparling | 148—138 |
| 2,233,455 | 3/41 | Larson | 29—492 |
| 2,327,839 | 8/43 | Zschoke. | |
| 2,405,946 | 8/46 | Gat | 148—12.3 |
| 2,439,637 | 4/48 | Steinmeyer | 148—127 X |
| 2,685,125 | 8/54 | Hansen | 29—504 |
| 2,770,871 | 11/56 | Demalander | 75—130 |
| 2,855,336 | 10/58 | Curry | 148—139 |
| 2,963,129 | 12/60 | Iberle | 29—504 X |
| 2,982,018 | 5/61 | Neely | 29—504 X |

OTHER REFERENCES

"Graphitization of Steel at Elevated Temperature," by Wilder et al., vol. 40, 1948, pages 233–249, Transaction American Society of Metals.

"Some Aspects of Graphitization in Steel," by G. V. Smith et al., vol. 43, 1951, pages 692–711, Transaction American Society of Metals.

DAVID L. RECK, *Primary Examiner.*

WHITMORE A. WILTZ, HYLAND BIZOT, *Examiners.*